(12) United States Patent
Osaka et al.

(10) Patent No.: US 7,852,579 B2
(45) Date of Patent: Dec. 14, 2010

(54) CAMERA MODULE

(75) Inventors: Tomohiko Osaka, Yamagata (JP); Takashi Ishizawa, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 450 days.

(21) Appl. No.: 11/928,127

(22) Filed: Oct. 30, 2007

(65) Prior Publication Data
US 2008/0117535 A1  May 22, 2008

Related U.S. Application Data

(63) Continuation-in-part of application No. 11/846,380, filed on Aug. 28, 2007, now Pat. No. 7,492,538.

(30) Foreign Application Priority Data

Aug. 31, 2006 (JP) ............................. 2006-236885
Oct. 30, 2006  (JP) ............................. 2006-294302

(51) Int. Cl.
  G02B 7/02   (2006.01)
  G03B 17/00  (2006.01)
(52) U.S. Cl. ..................................... 359/824; 396/529
(58) Field of Classification Search ......... 359/811–824, 359/829; 396/55, 75, 82, 85, 529; 398/373
See application file for complete search history.

(56) References Cited

U.S. PATENT DOCUMENTS

| | | | | |
|---|---|---|---|---|
| 7,161,751 B2 * | 1/2007 | Hasegawa et al. | ........... | 359/829 |
| 7,433,136 B2 * | 10/2008 | Ichikawa et al. | ............ | 359/811 |
| 7,492,538 B2 * | 2/2009 | Ishizawa et al. | ............. | 359/824 |
| 2003/0062978 A1 | 4/2003 | Shiraki et al. | | |
| 2006/0203627 A1 | 9/2006 | Osaka | | |

FOREIGN PATENT DOCUMENTS

EP  1775615 A  4/2007

* cited by examiner

Primary Examiner—Mohammed Hasan
(74) Attorney, Agent, or Firm—Marger Johnson & McCollom, P.C.

(57) ABSTRACT

A camera module includes a lens unit which constitutes an optical system of the camera module; a holder which houses the lens unit and is displaceable along an optical axis direction of the lens unit, and the coil having a hollow cylindrical portion; a coil having a cylindrical form and provided around the cylindrical portion of the holder; a yoke and magnets provided on the yoke for providing a magnetic field to the coil; upper and lower leaf springs for supporting the holder so that the holder is displaceable along an optical axis direction of the lens unit; and an imaging element provided below the lens unit. The holder has coil holding portions to which the coil is fitted for fixedly providing the coil around the cylindrical portion of the holder without using an adhesive.

3 Claims, 7 Drawing Sheets

CAMERA MODULE

RELATED APPLICATION DATA

This application claims priority from Japanese Application 2006-294302, filed Oct. 30, 2006, and is a continuation-in-part of commonly-owned, patent application U.S. Ser. No. 11/846,380, filed Aug. 28, 2007, now U.S. Pat. No. 7,492,538 B2, which claims priority to Japanese Application 2006-236885, filed Aug. 31, 2006.

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Related Art

A camera module having a function of displacing a lens unit in a direction of an optical axis of the lens unit is used in relatively small-sized digital cameras, camera-equipped cellular phones and the like. This function is used for providing an autofocus function and/or zoom function and the like, and is achieved by an interaction between a magnetic field generated by an electrical current flowing in a coil and a magnetic field generated by a yoke and magnets provided on the yoke.

Such a camera module includes a barrel which holds the lens unit, a holder which houses the barrel therein, and a pair of leaf springs for supporting the holder so that the holder is displaceable in a direction of an optical axis of the lens unit.

FIG. 6 is an exploded perspective view of an autofocus actuator assembly 100 used in a conventional camera module for displacing a lens unit (not shown) in a direction of an optical axis thereof. It is to be noted that an imaging element (not shown) is provided below a base 111 of the actuator assembly 100.

A holder 108 that houses a barrel (not shown) holding the lens unit is provided in a space between a cover 101 and the base 111 so that the holder 108 is displaceable in a direction of an optical axis of the lens unit together with the lens unit.

A ring-shaped inner annular portion 104b of an upper leaf spring 104 and a ring-shaped inner annular portion 110b of a lower leaf spring 110 are attached to the upper and lower cylindrical end portions of the holder 108, respectively, using an adhesive. The upper cylindrical end of the holder 108 is positioned on the side of a cover 101 and the lower cylindrical end of the holder 108 is positioned on the side of a base 111. Further, an outer annular portion 104a of the upper leaf spring 104 is attached to a top surface of a yoke 105 and an outer annular portion 110a of the lower leaf spring 110 is provided on a lower end of the yoke 105, respectively. Furthermore, on the upper surface of the inner annular portion 104b of the upper spring 104 which is attached to the upper cylindrical end portion of the holder 108, a stopper denoted by the reference numeral 102 is attached using an adhesive.

Three bridge portions 104c are coupled between the outer annular portion 104a and the inner annular portion 104b of the upper leaf spring 104. As is the same with the upper leaf spring 104, three bridge portions 110c are coupled between the outer annular portion 110a and the inner annular portion 110b of the upper leaf spring 110. By resilient deformation of the respective three bridge portions 104c and 110c, the holder 108 can be displaced in a direction of an optical axis of the lens unit.

A plurality of magnets 106 are provided on the yoke 105 so as to produce a magnetic field. The yoke 105 has an axial bore 105a for receiving the holder 108. Further, a coil 107 is provided around an outer periphery of the holder 108 so that the coil 7 is disposed in the magnetic field produced by the magnets 106 and the yoke 105 in a state that the holder 108 is received in the axial bore 110a. By supplying a current to the coil 107 to generate a magnetic field, the holder 108 can be displaced in a direction of an optical axis of the lens unit by a driving force generated by the interaction of the magnetic fields. In this regard, it is to be noted that a component donated by the reference numeral 109 in FIG. 6 is a ring-shaped plate provided between the lower leaf spring 110 and the lower end of the yoke 105. Further, a flexible printed circuit board 103 for supplying an electrical current to the coil 107 is provided below the outer annular portion 110a of the lower leaf spring 110.

As shown in FIGS. 6 and 7, the holder 108 has three coil support portions 108a at three locations of an outer periphery thereof. The coil 107 is attached to a bonding part 108b of each of the coil support portions 108a with an adhesive such as an epoxy resin.

It is to be noted that an actuator assembly similar to the actuator assembly 100 described above is disclosed in JP-A-No. 2004-280031.

As described above, in order to provide the coil 107 around the holder 108, it is necessary to attach the coil 107 to the coil support portions 108a provided on the outer periphery of the holder 108 with the epoxy resin. For this purpose, it is necessary to apply the epoxy resin to each of the bonding parts 108b of the coil support portions 108a. Such a bonding work of the coil 7 requires a time for applying the epoxy resin as well as a time for curing the applied epoxy resin, which results in a problem in that it is not possible to shorten a time required for manufacturing the camera module.

Further, a bonding area of each of the bonding parts 108b of the coil support portions 108a is extremely small. Therefore, there is another problem in that when the small-sized electronic apparatuses equipped with the camera module is dropped by an accident, the coil 107 is removed or peeled off from the bonding parts 108b due to the dropping impact.

SUMMARY OF THE INVENTION

The present invention has been made in view of the problems described above, and therefore it is an object of the present invention to provide a camera module in which a coil can be provided around a holder easily in a state that the coil is firmly attached to the holder.

In order to achieve the object, the present invention is directed to a camera module, which comprises: a lens unit which constitutes an optical system of the camera module; a holder which houses the lens unit and is displaceable along an optical axis direction of the lens unit, and the holder having a hollow cylindrical portion; a coil having a cylindrical form and provided around the cylindrical portion of the holder; a yoke and magnets provided on the yoke for providing a magnetic field to the coil; upper and lower leaf springs for supporting the holder so that the holder is displaceable along an optical axis direction of the lens unit; and an imaging element provided below the lens unit. The holder has coil holding portions to which the coil is fitted for fixedly providing the coil around the cylindrical portion of the holder.

According to the camera module of the present invention having the above structure, the coil can be provided around the cylindrical portion of the holder without using an adhesive. Therefore, it is not necessary to carry out a bonding work for attaching the coil to the holder which was carried out in manufacturing the conventional camera module. As a result, since a time required for applying an adhesive and a time required for curing the adhesive become unnecessary, it is possible to shorten a total manufacturing time of a camera module. Further, since the coil is attached to the holder without using any adhesive, it is possible to avoid a problem that the coil is removed from the holder even in the event that when the small-sized electronic apparatuses equipped with the camera module is dropped by an accident and a large shock is added to the camera module.

In the camera module of the present invention, it is preferred that each of the coil holding portions extends in a direction along which the holder can be displaced, and has a hook portion which is engaged with an upper end of the coil, a post portion which supports an inner circumferential portion of the coil and a support base portion which support a lower end of the coil.

According to this first modification of the camera module of the present invention having the above structure, in each of the coil holding portions, the hook portion which is engageable with the upper end of the coil, the support base portion for supporting the lower end of coil and the post portion extending between the hook portion and the support base portion form a concave portion for receiving the coil, and the coil is fixedly fitted to the concave portion.

In the camera module of the present invention, it is also preferred that the coil is formed by winding a wire so as to have a first cylindrical portion where the thickness of the coil in cross section is reduced due to a number of winding of the wire being small and a second cylindrical portion where the thickness of the coil in cross section is increased due to a number of winding of the wire being larger than that of the first portion so that a step is formed between the first cylindrical portion and the second cylindrical portion on the inner circumferential surface side of the coil, wherein each of the coil holding portions has a hook part which is engaged with the step of the coil, and the hook part of the coil holding portion is located in a space created between the inner circumferential surface of the first cylindrical portion of the coil and the outer peripheral surface of the cylindrical portion of the holder.

According to the second modification of the camera module of the present invention having the above structure, the hook portions do not protrude above the upper end of the coil. This means that it is possible to lower the height of the holder as compared with the first modification, which makes it possible to provide a camera module having a more reduced thickness.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
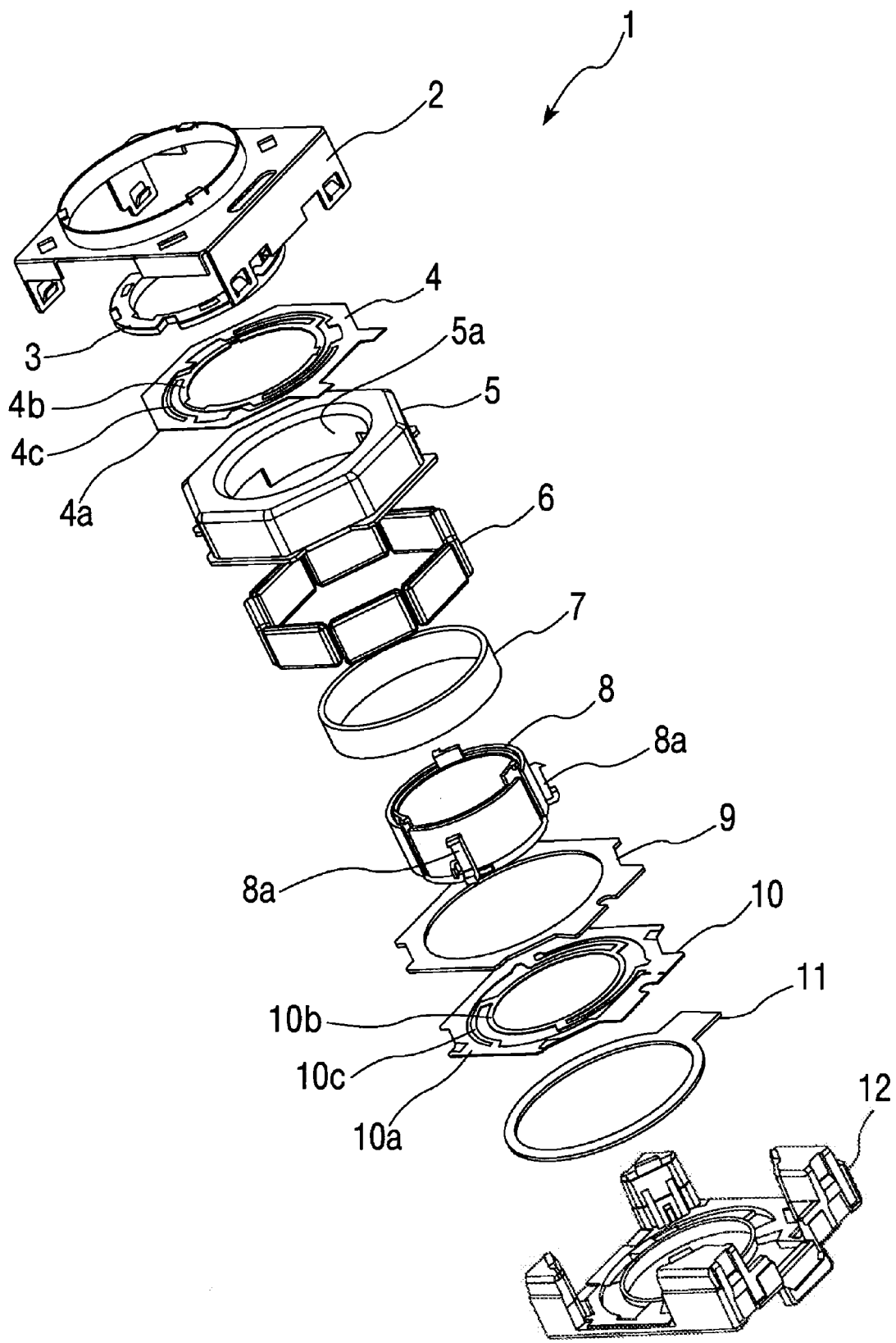
FIG. 1 is an exploded perspective view of an actuator assembly 1 of a camera module of a first embodiment according to the present invention.

A camera module according to embodiments of the present invention will be described below with reference to the accompanying drawing.

The camera module according to a first embodiment comprises: a lens unit (not shown) which constitutes an optical system of the camera module; a holder 8 which houses the lens unit and is displaceable along an optical axis direction of the lens unit and has a hollow cylindrical shape having upper and lower cylindrical end portions; a coil 7 wound so as to have a cylindrical shape and provided around the holder 8; a yoke 5 and magnets 6 provided on the yoke 5 for providing a magnetic field to the coil 7; upper and lower leaf springs 4, 10 for supporting the holder 8 so that the holder 8 is displaceable along an optical axis direction of the lens unit; and an imaging element (not shown) provided below the lens unit, wherein the camera module is characterized in that the holder 8 has coil holding portions to which the coil is fitted so that the coil is fixedly provided around a cylindrical portion of the holder 8.

Hereinbelow, with reference to FIG. 1, a description is made with regard to an actuator assembly 1 of the camera module of the first embodiment according to the present invention. In this regard, it is to be noted that an imaging element (not shown in the drawing) is disposed below a base 12.

In a space defined between a cover 2 and the base 12, the holder 8 which houses a barrel (not shown) holding the lens unit is provided so as to be displaceable in an optical axis direction of the lens unit.

The holder 8 is a cylindrical member made of a synthetic resin and the coil 7 is provided around a cylindrical portion of the holder 8. An inner annular portion 4b of the upper leaf spring 4 is attached the upper cylindrical end portion of the holder 8 and an inner annular portion 10b of the lower leaf spring 10 is attached to the lower cylindrical end portion of the holder 8, respectively. Further, an outer annular portion 4a of the upper leaf spring 4 is attached to a top surface of the yoke 5 provided on the base 12 and an outer annular portion 10a of the lower leaf spring 10 is attached to a lower end portion of the yoke 5 through an annular plate 19 (which will be described below in more detail). Furthermore, on the upper surface of the inner annular portion 4b of the upper spring 4 which is attached to the upper cylindrical end portion of the holder 8, a stopper 3 is attached using an adhesive. This stopper 3 is provided for restricting upwardly excessive displacement of the holder 8 by the abutment with the bottom surface of the cover 2 when the holder 8 is largely displaced.

Each of the upper and lower leaf springs 4, 10 is formed from a thin metal plate made of beryllium copper through a punching process, and has the outer annular portion 4a, 10a and the inner annular portion 4b, 10b which is concentrically provided inside the outer annular portion 4a, 10a through an annular spacing. The inner annular portion 4b, 10b is displaceably supported by the outer annular portion 4a, 10a through the three bridge portions 4c, 10c. Each of the bridge portions 4c, 10c has an elongated arc-shape which extends along the inner periphery of the outer annular portion 4a, 10a and the outer periphery of the inner annular portion 4b, 10b through a predetermined angle. By resilient deformation of the respective three bridge portions 4c and 10c, the holder 8 can be displaced in a direction of an optical axis of the lens unit.

The plurality of magnets 6 are bonded to the inner surface of the yoke 5 so as to produce a magnetic field. Further, the coil 7 is provided around an outer periphery of the holder 8 so that the coil 7 is disposed in the magnetic field generated by the magnets 6 and the yoke 5. The yoke 5 has an axial bore 5a for receiving the holder 8. The holder 8 can be displaced through the axial bore 5a in a direction of an optical axis of the lens unit by supplying an electrical current to the coil 7. Further, the annular plate 9 made of a magnetic metal material is provided between the lower leaf spring 10 and the bottom surface of the yoke 5 for reducing leakage of magnetic fluxes from the magnets 6. In this regard, it is to be noted that a component denoted by the reference numeral 11 is a flexible printed circuit board used for supplying a current to the coil 7.

Figure 2:
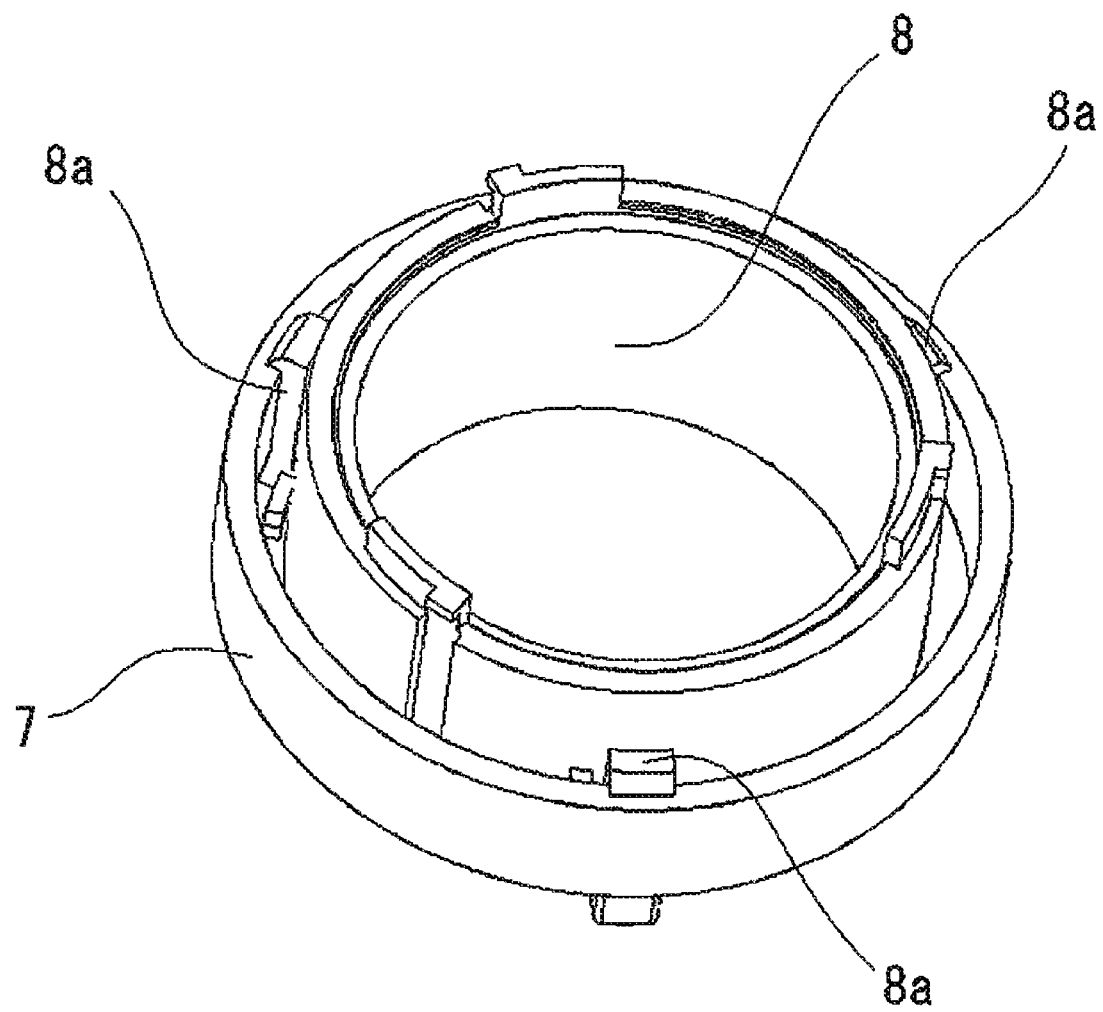
FIG. 2 is a perspective view which shows a coil 7 and a holder 8 of the actuator assembly 1 of the camera module shown in FIG. 1.
Figure 3:
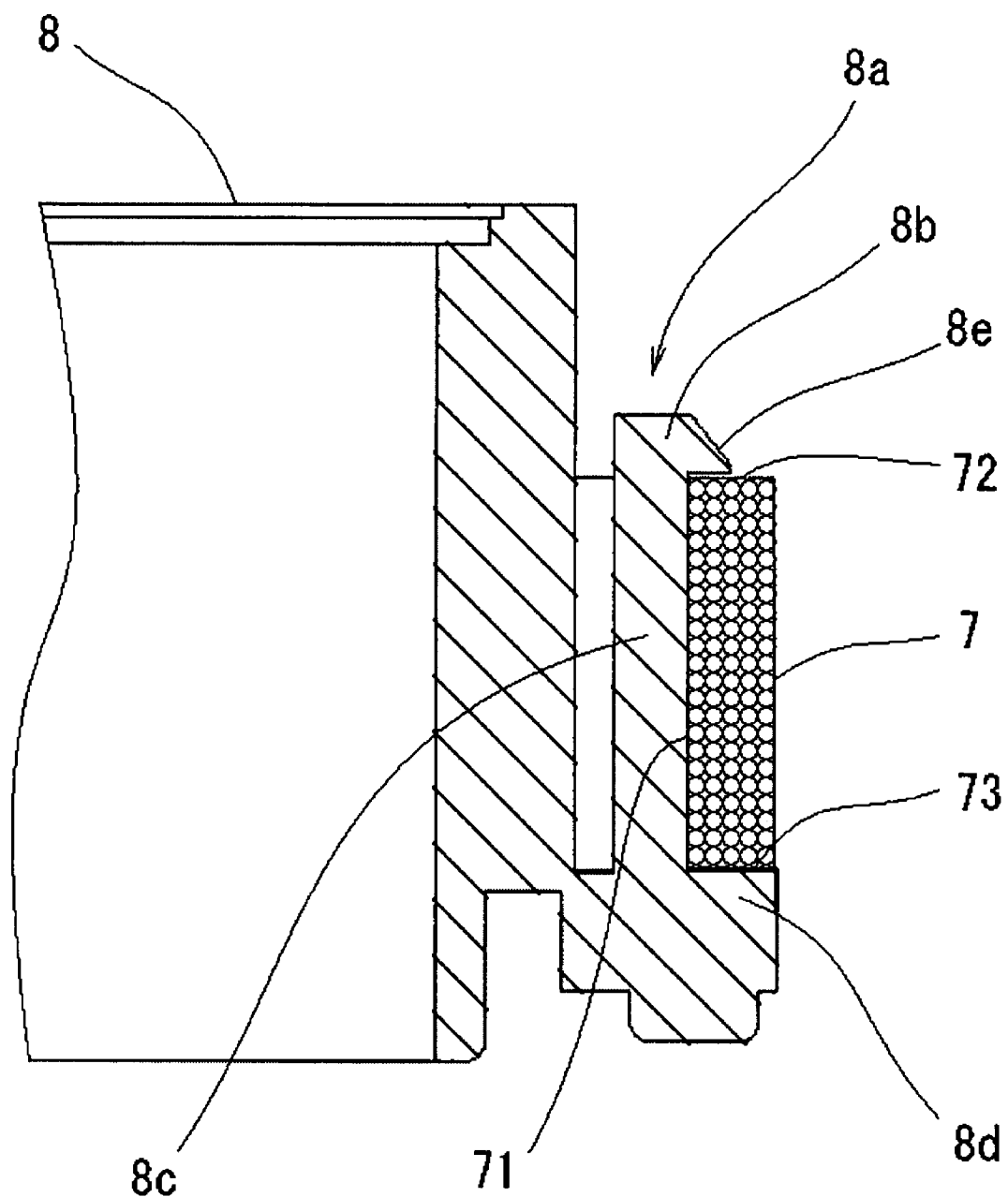
FIG. 3 is a vertical cross sectional view of a part of the coil 7 and the holder 8 shown in FIG. 2.

As shown in FIG. 2, on the outer periphery of the cylindrical portion of the holder 8, there are provided three coil holding portions 8a at a predetermined same spacing. As shown in FIG. 3, each of the coil holding portions 8a extends in a direction along which the holder 8 can be displaced, and has a hook portion 8b which is engageable with an upper end 72 of the coil 7, a post portion 8c for supporting an inner circumferential portion 71 of the coil 7 and a support base portion 8d for supporting a lower end 73 of the coil 7, which are arranged in this order in a top-bottom direction. These coil holding portions 8a are integrally formed with the cylindrical portion of the holder 8, and has flexibility in a certain degree.

As shown in FIGS. 2 and 3, in each of the coil holding portions 8a, the hook portion 8b which is engageable with the upper end 72 of the coil 7, the support base portion 8d for supporting the lower end 73 of coil 7 and the post portion 8c extending between the hook portion 8b and the support base portion 8d form a concave portion for receiving the coil 7, and the coil 7 is fixedly fitted to the concave portion. In this way, the coil 7 is fitted into and held by the coil holding portions 8a, and as a result, the coil 7 is fixedly held by the coil holding portions 8a without using any adhesive such as a synthetic resin. In this state, the upper end 72 of the coil 7 is held by the hook portions 8b of the coil holding portions 8a, the inner circumferential portion 71 of the coil 7 is supported on the post portions 8c of the coil holding portions 8a, and the lower end 73 of the coil 7 is held by the support base portions 8d of the coil holding portions 8a, respectively. In this structure, the distance between the hook 8b and the support base portion 8d each of the coil holding portions 8a is set so as to be substantially the same as the distance between the upper end 72 and the lower end 73 of the coil 7, and a diameter of a circle defined by the outer wall parts of the post portions 8c of the coil holding portions 8b is the substantially the same as the inner diameter of the inner circumferential part 71 of the coil 7. With this result, the coil 7 is fixedly held by the coil holding portions 8a not only in the horizontal direction but also in the vertical direction.

As stated in the above, the coil holding portions 8a have flexibility. Therefore, by pushing down the coil 7 from above the holder 8 so that the coil 7 is fitted onto the coil holding portions 8a, the inclined surface 8e of the hook portion 8b of each of the coil holding portions 8a is pushed by the lower end 73 of the coil 7 so that the post portion 8c of each coil holding portion 8a is deformed toward the outer periphery of the cylindrical portion of the holder 8. When the lower end 73 of the coil 7 reaches at and abuts with the support base portion 8d of each of the coil holding portions 8a, the deformed post portion 8c of each the of the coil holding portions 8a is restored into its original state so that the hook portion 8b is engaged with the upper end 72 of the coil 7. As a result, the coil 7 is fixedly held by the coil holding portions 8a.

According to the embodiment described above, the coil 7 can be provided around the cylindrical portion of the holder 8 without using an adhesive. Therefore, it is not necessary to carry out a bonding work for attaching the coil 7 to the holder which was carried out in manufacturing the conventional camera module. As a result, since a time required for applying an adhesive and a time required for curing the adhesive become unnecessary, it is possible to shorten a total manufacturing time of a camera module. Further, since the coil 7 is attached to the holder without using any adhesive, it is possible to avoid a problem in that the coil is removed or peeled off from the holder 8 even in the event that when the small-sized electronic apparatuses equipped with the camera module is dropped by an accident and a large shock is added to the camera module.

Figure 4:
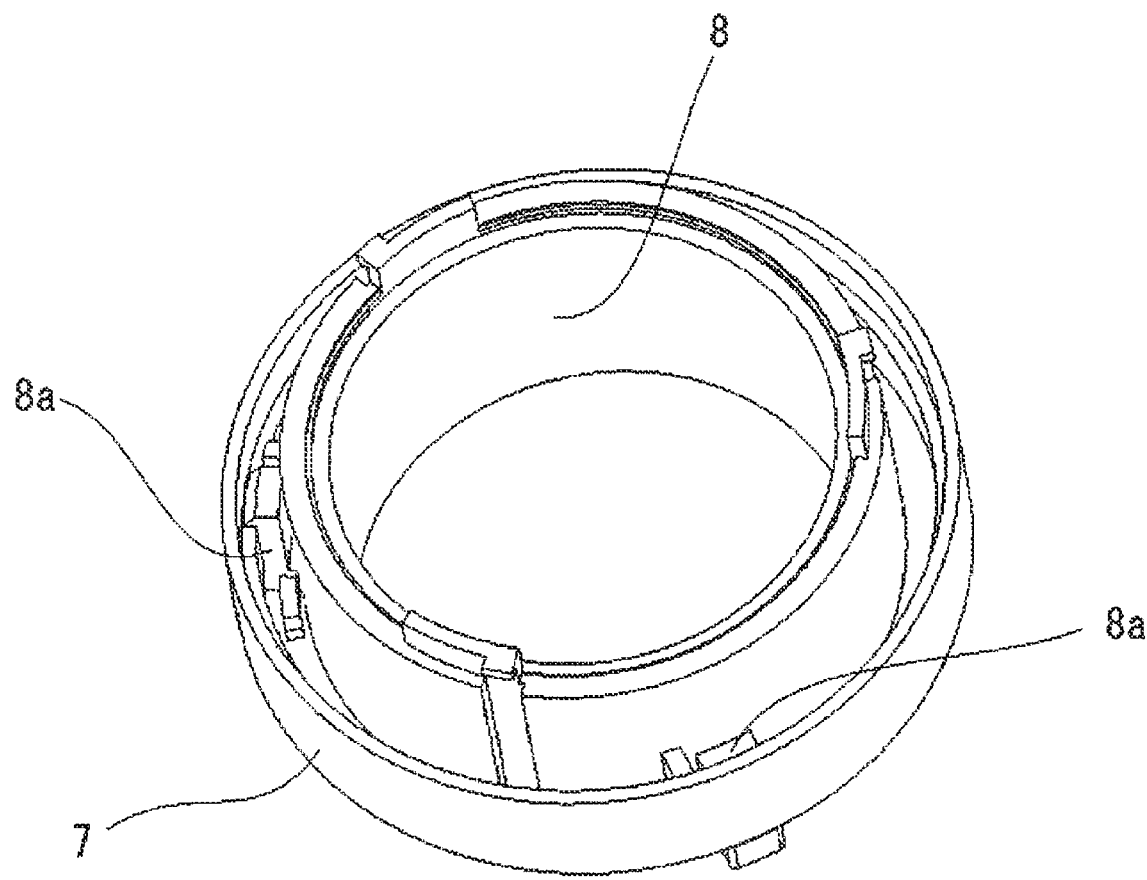
FIG. 4 is a perspective view which shows a coil 7 and a holder 8 of an actuator assembly 1 of a camera module of a second embodiment according to the present invention.
Figure 5:
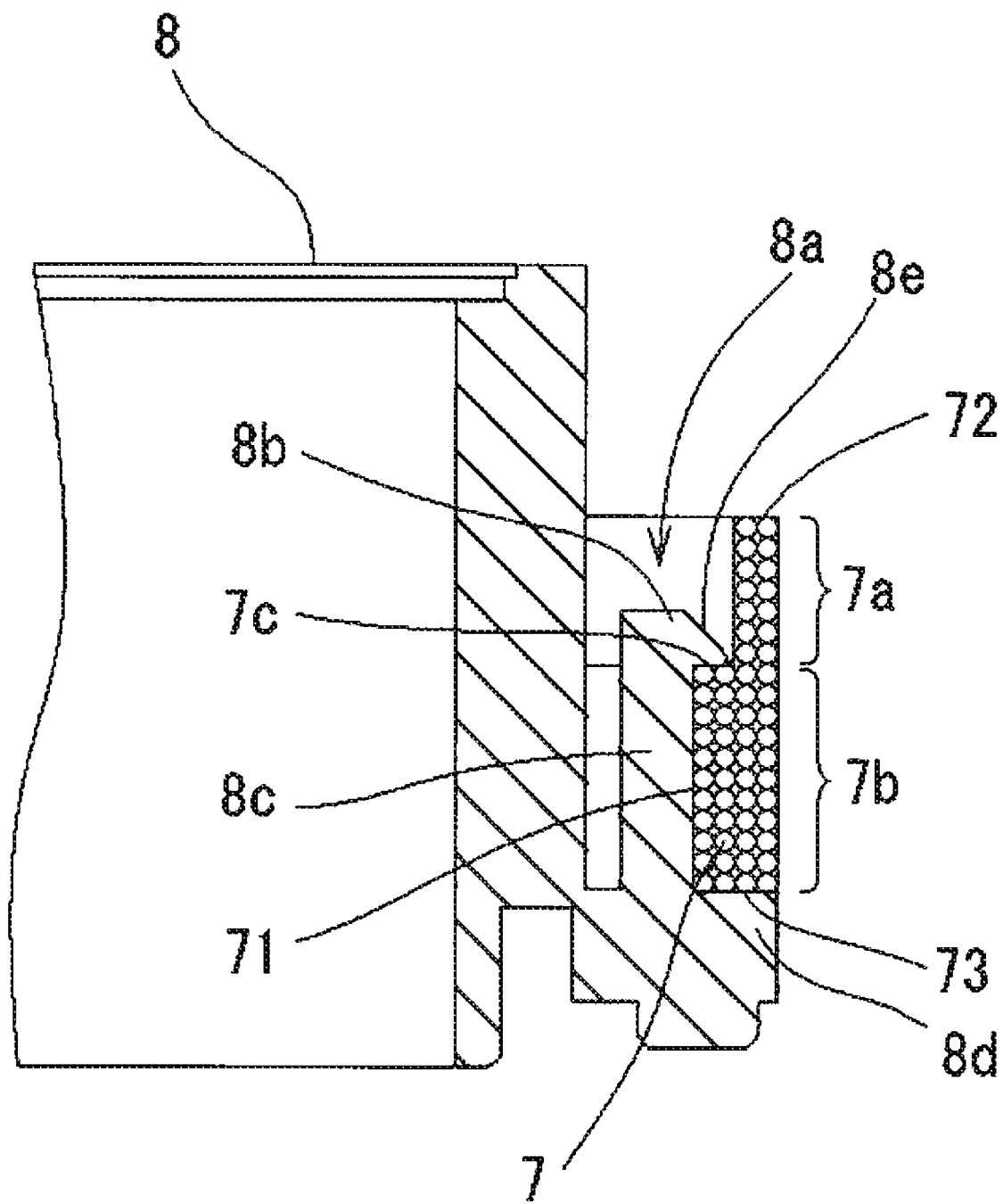
FIG. 5 is a vertical cross sectional view of a part of the coil 7 and the holder 8 shown in FIG. 4.
Figure 6:
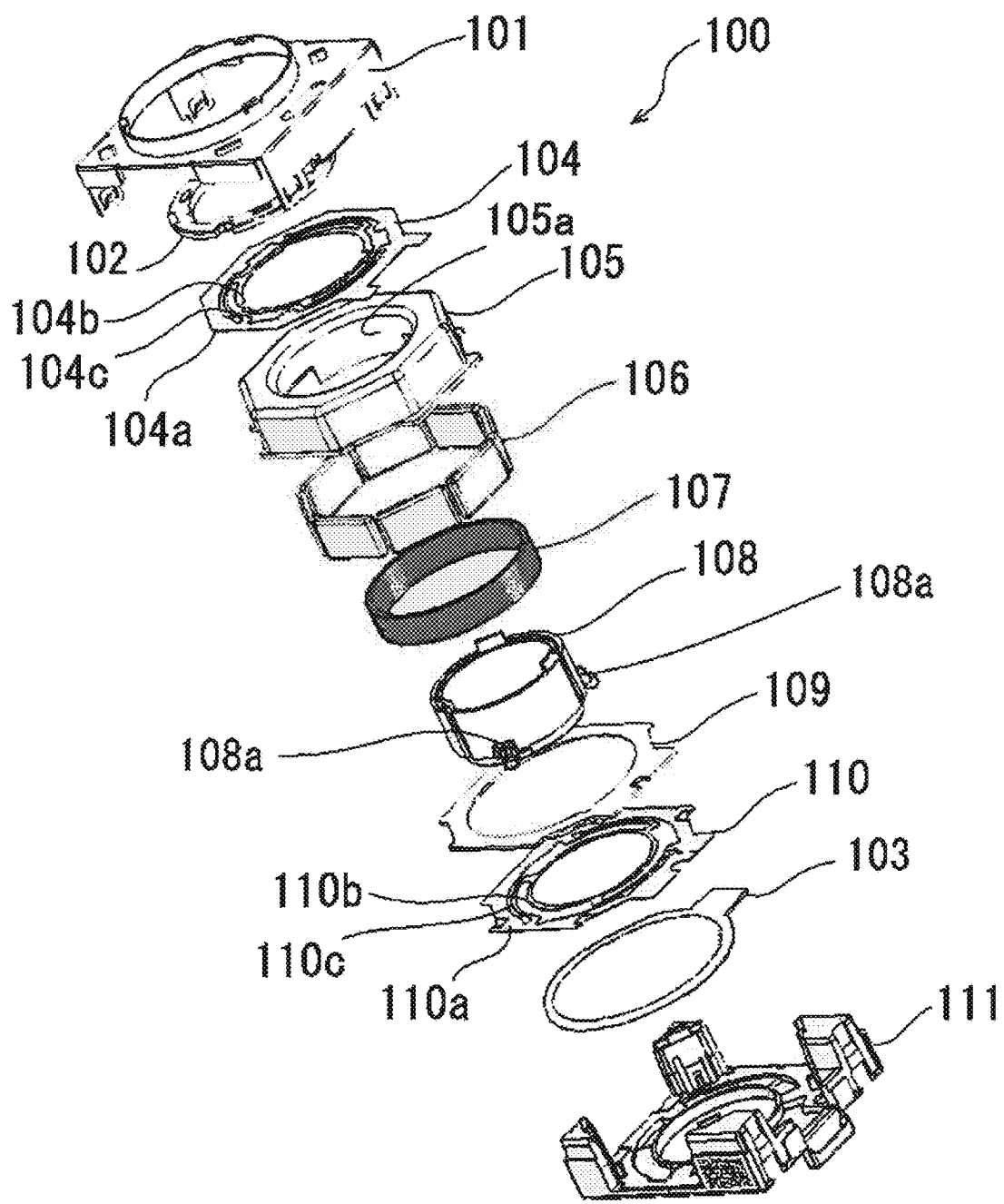
FIG. 6 is an exploded perspective view of an actuator assembly 100 of a conventional camera module.
Figure 7:
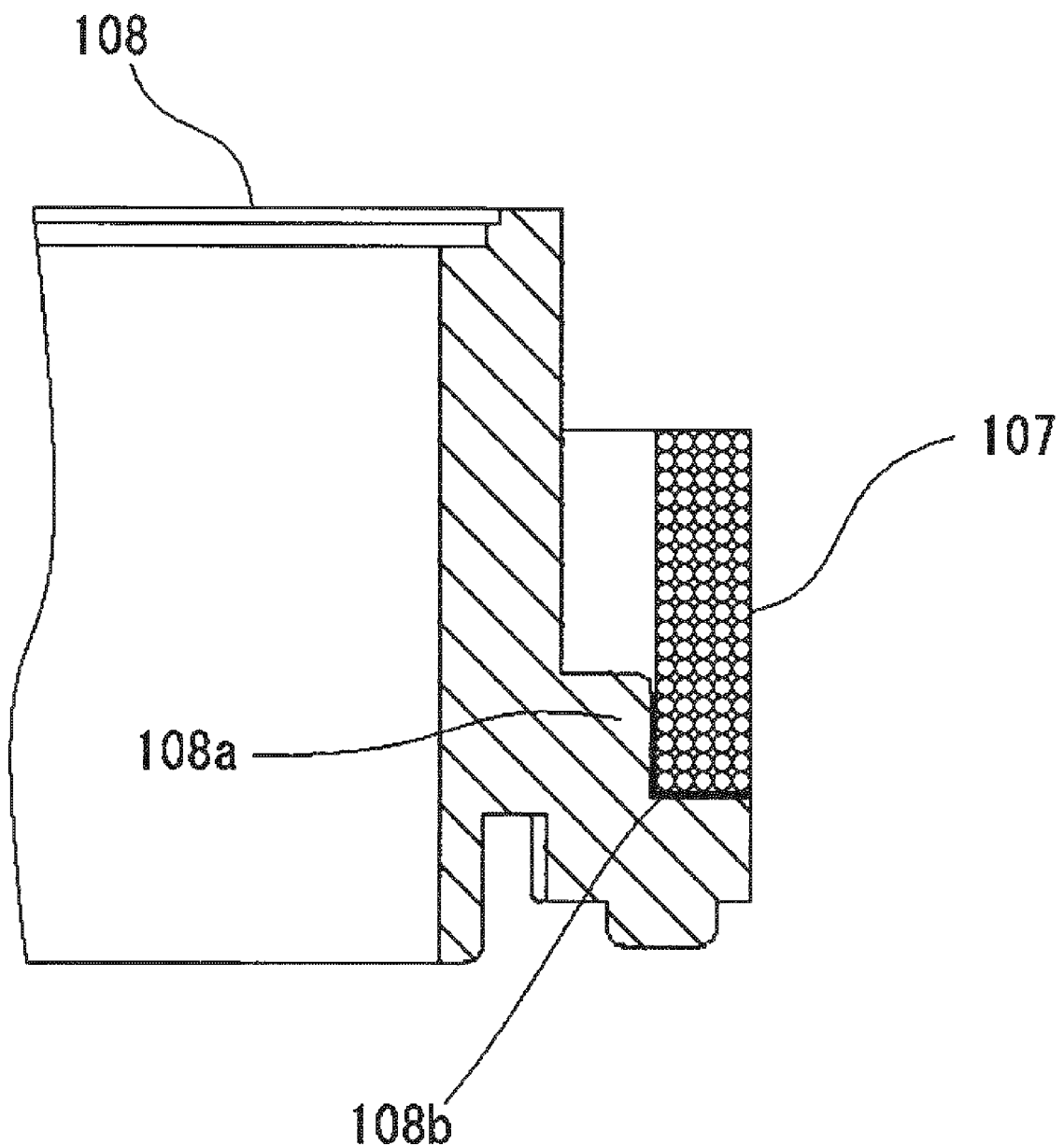
FIG. 7 is a vertical cross sectional view of a part of a coil 107 and a holder 108 of the camera module shown in FIG. 6.

Next, with reference to FIGS. 4 and 5, a description will be made with regard to a second embodiment of the present invention. In this regard, it is to be noted that this second embodiment has the same structure as that of the first embodiment except that the shape of the coil 7 and the structure of each coil holding portion 8a are different from those of the first embodiment. Therefore, in the following description, the same reference numerals are assigned to the same components or parts of these embodiments.

In this second embodiment, a coil 7 is formed by winding a wire so as to have a first cylindrical portion 7a where the thickness of the coil 7 in cross section is reduced due to a number of winding of the wire being small and a second cylindrical portion 7b where the thickness of the coil in cross section is increased due to a number of winding of the wire being larger than the first cylindrical portion so that a step 7c is formed between the first cylindrical portion 7a and the second cylindrical portion 7b on the inner circumferential surface side of the coil 7. Further, each of the coil holding portions 8a has a hook portion 8b which is engageable with the step 7c of the coil 7, and the hook portion 8b of each coil holding portion 8a is located in a space created between the inner circumferential surface of the first cylindrical portion 7a of the coil 7 and the outer peripheral surface of the cylindrical portion of the holder 8.

The coil 7 of this embodiment is formed by winding a wire of self-melting type around a gig having a circumferential wall formed into a step, and thereafter heating the wire and then cooling the wire to harden it. In this embodiment, the total length of the hook portion 8b and a post portion 8c of each of the coil holding portions 8a is shorter than the corresponding portions of each of the coil holding portions 8a of the first embodiment. Further, the total length of the hook portion 8b and the post portion 8c of each of the coil holding portions 8a is shorter than the distance between the upper end and the lower end of the coil 7. Therefore, when the coil 7 is fitted to the coil holding portions 8a, the hook portions 8b are located in a space created between the inner circumferential surface of the first portion 7a of the coil 7 and the outer circumferential surface of the cylindrical portion of the holder 8, and thus the hook portions 8b do not protrude above the upper end 72 of the coil 7.

According to this second embodiment, as is the same with the first embodiment, the coil 7 can be provided around the cylindrical portion of the holder 8 without using an adhesive. Therefore, it is not necessary to carry out a bonding work for attaching the coil 7 to the holder which was carried out in manufacturing the conventional camera module. As a result, since a time required for applying an adhesive and a time required for curing the adhesive become unnecessary, it is possible to shorten a total manufacturing time of a camera module. Further, since the coil 7 is attached to the holder without using any adhesive, it is possible to avoid a problem in that the coil 7 is removed or peeled off from the holder 8 even in the event that when the small-sized electronic apparatuses equipped with the camera module is dropped by an accident and a large shock is added to the camera module.

In addition, since the hook portions 8b do not protrude above the upper end 72 of the coil 7 as described above. This means that it is possible to lower the height of the holder 8 as compared with the first embodiment, which makes it possible to provide a camera module having a more reduced thickness.

Although in the first and second embodiments described above, the coil holding portions 8a are formed at three locations of the outer periphery of the cylindrical portion of the holder 8, four or more coil holding portions 8a may be formed. Further, since the shapes of the portions of the coil holding portions 8a and the shape of the step 7c of the coil described above are mere one example, they may be changed into other forms or shapes.

Finally, it is also to be understood that the present disclosure relates to subject matter contained in Japanese Patent Application No. 2006-294302 (filed on Oct. 30, 2006) which is expressly incorporated herein by reference in its entirety.

What is claimed is:

1. A camera module, comprising:
   a lens unit which constitutes an optical system of the camera module;
   a holder which houses the lens unit and is displaceable along an optical axis direction of the lens unit, and the holder having a hollow cylindrical portion;
   a coil having a cylindrical form and provided around the cylindrical portion of the holder;
   a yoke and magnets provided on the yoke for providing a magnetic field to the coil;
   upper and lower leaf springs for supporting the holder so that the holder is displaceable along an optical axis direction of the lens unit; and
   an imaging element provided below the lens unit,
   wherein the holder has coil holding portions to which the coil is fitted for fixedly providing the coil around the cylindrical portion of the holder; and
   wherein each of the coil holding portions extends in a direction along which the holder can be displaced, and has a hook portion which is engaged with a portion of the coil, a post portion which supports at least a part of an inner circumferential portion of the coil and a support base portion which supports a lower end of the coil.

2. The camera module as claimed in claim 1, wherein the portion of the coil to which the hook portion of each coil holding portion is engaged is a portion of an upper end of the coil, a coil and each post portion supports an entire inner circumferential portion of the coil.

3. The camera module as claimed in claim 1, wherein the coil is formed by winding a wire so as to have a first cylindrical portion where the thickness of the coil in cross section is reduced due to a number of windings of the wire being small and a second cylindrical portion where the thickness of the coil in cross section is increased due to a number of windings of the wire being larger than that of the first portion so that a step is formed between the first cylindrical portion and the second cylindrical portion on the inner circumferential surface side of the coil,
   wherein the portion of the coil to which the hook portion of the coil holding portion is located in a space created between the inner circumferential surface of the first cylindrical portion of the coil and the outer peripheral surface of the cylindrical portion of the holder, and each post portion of the coil holding portion supports an entire inner circumferential portion of the second cylindrical portion of the coil.

* * * * *

UNITED STATES PATENT AND TRADEMARK OFFICE
CERTIFICATE OF CORRECTION

| | |
|---|---|
| PATENT NO. | : 7,852,579 B2 |
| APPLICATION NO. | : 11/928127 |
| DATED | : December 14, 2010 |
| INVENTOR(S) | : Tomohiko Osaka et al. |

It is certified that error appears in the above-identified patent and that said Letters Patent is hereby corrected as shown below:

Column 2, line 5, "110a" should read --105a--;

Column 8, line 17, "coil, a coil and each post portion" should read --coil and each post portion--.

Signed and Sealed this
Fifteenth Day of February, 2011

David J. Kappos
*Director of the United States Patent and Trademark Office*